United States Patent [19]

Takata

[11] 4,336,572
[45] Jun. 22, 1982

[54] REMOTE CONTROLLER AND MORE PARTICULARLY TO SLIDE MEMBER THEREOF

[75] Inventor: Yasunobu Takata, Odawara, Japan

[73] Assignees: Nissan Motor Company Limited; Ichiko Industries Limited, both of Tokyo, Japan

[21] Appl. No.: 131,179

[22] Filed: Mar. 17, 1980

Related U.S. Application Data

[63] Continuation of Ser. No. 944,006, Sep. 20, 1978, abandoned.

[30] Foreign Application Priority Data

Sep. 26, 1977 [JP] Japan ................................ 52-129671

[51] Int. Cl.³ .............................................. B60Q 1/06
[52] U.S. Cl. ....................................... 362/66; 362/40; 362/273; 362/425; 362/233
[58] Field of Search ................... 362/66, 40, 273, 425, 362/233

[56] References Cited

U.S. PATENT DOCUMENTS 4,141,063  2/1979  Kumagai et al. ..................... 362/40

*Primary Examiner*—Stephen J. Lechert, Jr.

[57] ABSTRACT

The invention relates to a slide member of a remote controller of a device for adjusting the angle at which the headlight beams from a motor vehicle are directed down onto the road surface, from within the vehicle. The remote controller comprises a guide case and a slide member mounted to the guide case for axial movement but against rotation with respect to the guide case. The slide member is adjusted by a threaded rotatable shaft mounted to the guide case for rotation but against axial movement with respect to the guide case. The slide member includes an end wall, a first side wall, a second side wall and a block having a part-cylindrical surface formed with a threaded portion with which the threaded rotatable shaft engages. The first and second side walls extend parallel to each other and are connected to the end wall and the block.

2 Claims, 12 Drawing Figures

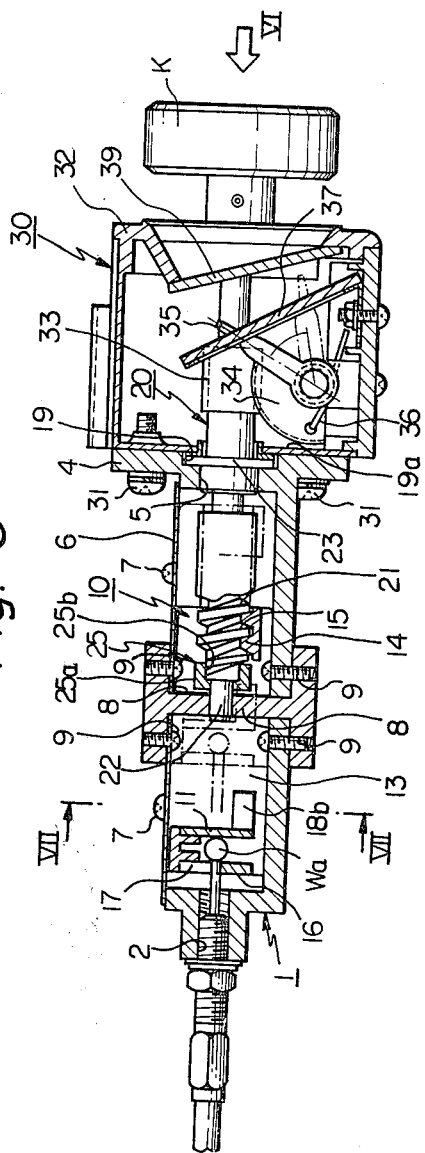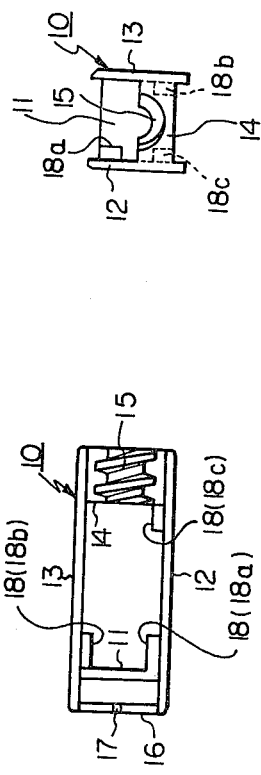
Fig. 3
Fig. 4
Fig. 5

REMOTE CONTROLLER AND MORE PARTICULARLY TO SLIDE MEMBER THEREOF

This is a continuation of application Ser. No. 944,006 filed Sept. 20, 1978, now abandoned.

BACKGROUND OF THE INVENTION

This invention relates to a slide member of a remote controller of a device for adjusting the angle at which the headlight beams from a motor vehicle are directed down onto the road surface, from within the vehicle.

As is well known the light beams emitted from the headlights of a motor vehicle will vary in response to the longitudinal inclination of the vehicle owing to a change in the weight distribution, such as owing to the passenger getting on or off the vehicle and/or owing to the addition or removal of a relatively large amounts of load or weight. If the light beams are varied and can not be directed properly, the blinding of the driver of an oncoming motor vehicle may occur or the proper front view may not be secured.

Thus a various kinds of devices have been proposed which control the angle at which the light beams are directed at the surface of the road.

One device proposed for controlling the above mentioned angle involves the headlights mounted on frames hingedly or pivotably mounted at the front of a motor vehicle and controls the beam angle by moving the headlight mounting frames via the use of a plurality of control wires from a remote controller installed within the reach of a driver.

Such a headlight beam angle adjusting device is illustrated in FIG. 1, wherein the remote controller R, installed in the passenger compartment of the vehicle at the instrument panel or dash panel I and provided with a manually operable knob K, is connected to one terminal of a control wire W and pulls or pushes the control wire W in response to rotation in one direction or rotation in the opposite direction of the knob K, thereby to rotate a link, in the form of a two-arm lever L, rotatably mounted at the front bulkhead of the vehicle. This rotation in one or the opposite direction of the lever L will pull or push two wires W' leading respectively to headlight mounting frames H.L, so as to move the headlight mounting frames H.L around their respective hinges to adjust them angularily, thereby to adjust the headlight beam angles of the headlights, not shown, mounted to the headlight mounting frames H.L. Each headlight mounting frame H.L is urged by means of return springs S.S forwardly against a stopper S.

The remote controller R used in the adjusting device employs a slide member to which one terminal of the control wire W is fixedly connected and a shaft which is rotatable by the knob K. The slide member is formed with a blind bore to receive the shaft and threads are formed in the bore and the shaft which are selected so that clockwise rotation of the knob K will urge the slide member either away from or toward same depending on economical considerations (i.e., the location and the ease of use in that position). Counterclockwise rotation of the knob K will urge the slide member in the opposite direction to the direction of movement of the slide member due to the clockwise rotation of the knob K.

The problem encountered is that since, in forming the slide member, tapping a threaded bore in the slide member is necessary, the productivity upon manufacturing the slide member is considerably reduced. Another problem is that when it is required to provide at the leading end of a male threaded portion of the rotatable shaft a stop piece bigger than the outer diameter of the male threaded portion in order to prevent unnecessary rotation of the shaft, a slide member having its female threaded portion of complicated construction or a stop piece having a complicated construction has to be used.

SUMMARY OF THE INVENTION

It is therefore an object of the present invention to increase the productivity upon manufacturing a slide member of a remote controller for a vehicle headlight beam adjusting device.

It is a specific object of the present invention to provide a slide member of a remote controller which does not require a step of tapping a bore to form a threaded portion upon its manufacture.

It is another object of the present invention to provide a slide member of a remote controller which has such a construction as to allow ease of assembly with a rotatable shaft having a threaded portion cooperable with the threaded portion of the slide member.

BRIEF DESCRIPTION OF THE DRAWINGS

In the accompanying drawings:

FIG. 3 is a sectional view taken through the line III—III of FIG. 2;

FIG. 4 is a plan view of the slide member;

FIG. 5 is an end view of the slide member;

DESCRIPTION OF THE PREFERRED EMBODIMENT

Figure 1:
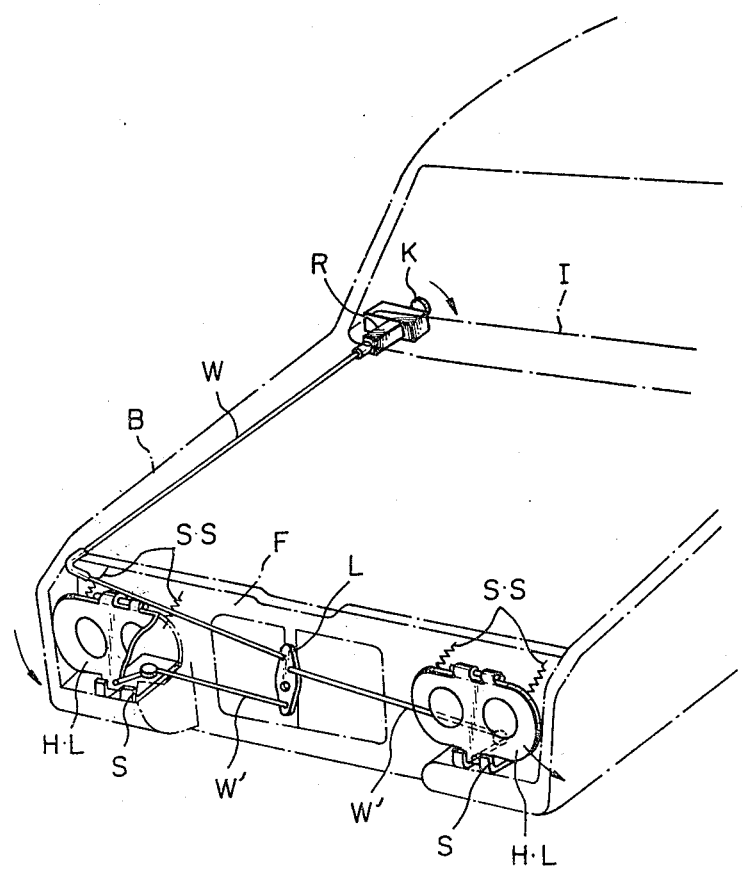
FIG. 1 is a schematic view showing the arrangement of a vehicle headlight beam adjusting device operatively mounted in a motor vehicle and employing a remote controller.
Figure 2:
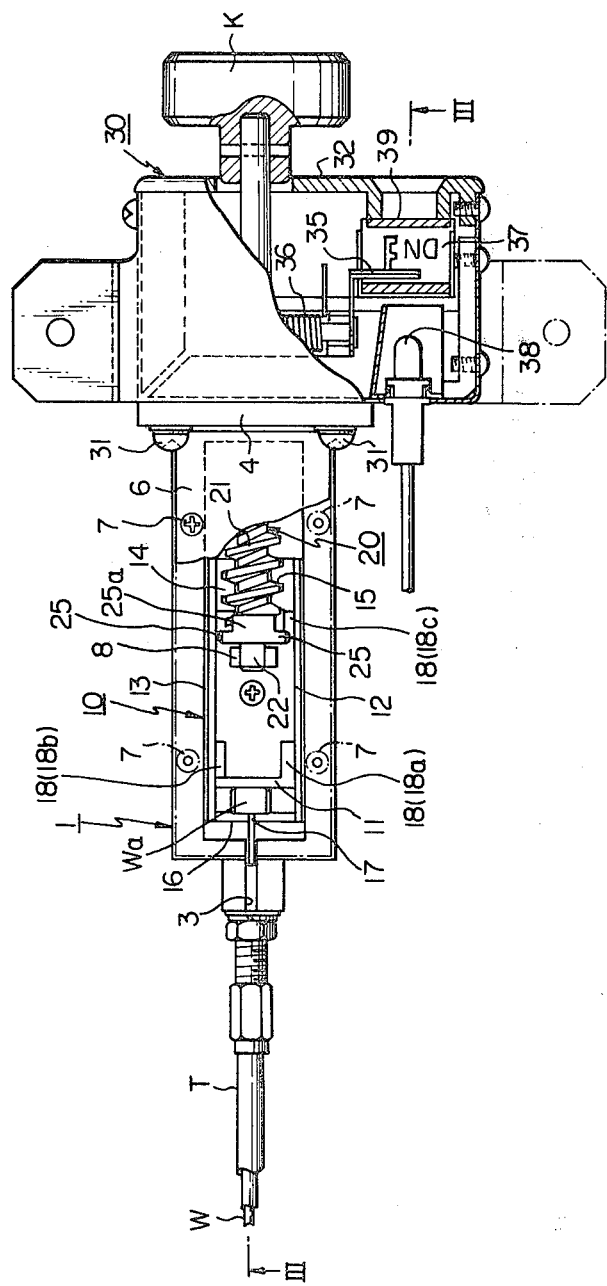
FIG. 2 is a side view, partly broken away to show longitudinal section, of the first preferred embodiment of a remote controller having a slide member according to this invention.
Figure 6:
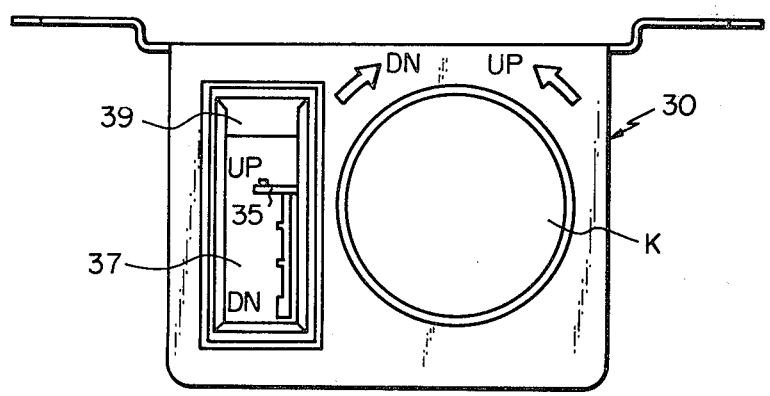
FIG. 6 is a plan view as viewed along an arrow VI of FIG. 3.
Figure 7:
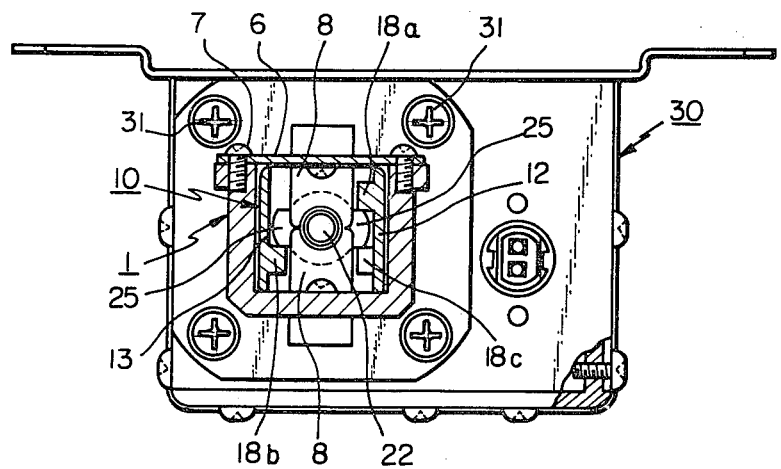
FIG. 7 is a sectional view taken through the line VII—VII of FIG. 3.

Referring to FIGS. 1 through 10, the numeral 1 denotes a guide case of a synthetic resin formed by a moulding process and the guide case 1 is mounted to an instrument panel I of a motor vehicle (see FIG. 1). Guide case 1 has a rectangular cross sectional bore, four flat side walls which are connected one after another to define the bore and a first end wall and a second flanged end wall which cooperate with the side walls to close ends of the bore. The first end wall has an outwardly projected portion formed with a threaded hole 2 extending therethrough (see FIG. 3) to fixedly receive therein one terminal end portion of an outer tube T of a control wire N (see FIG. 1). As shown in FIG. 2, a slit 3 is formed in the projection to permit, in assembly, the control wire W to pass therethrough toward the threaded bore 2. Flanged end wall 4 is formed with an opening 5 (see FIG. 3) through which a rotatable shaft extends. To the flanged end wall 4 an indicator unit 30 is secured (see FIGS. 2 and 3). One of the side walls is a case cover or lid 6 secured to the adjacent two of the other side walls by means of a plurality of screws 7. A pair of bearings 8 for supporting the rotatable shaft are fixedly mounted to the case cover 6 and the side wall opposite to the case cover 6, respectively, by means of a plurality of screws 9 (see FIG. 3) and disposed at an intermediate between the first end wall and the flanged second end wall 4.

The numeral 10 denotes a metal slide member which is slidably mounted within the bore of the guide case 1 for axial movement but against rotation with respect to the guide case 1 and which includes a front end wall 11, a left side wall 12, a right side wall 13 and a rear end block 14 having a female threaded portion 15. The left side wall 12 and right side wall 13 extend in parallel to each other and are connected to the front end wall and the rear end block 14. Since the cross section of the slide member 10 and that of the bore of the guide case 1 are rectangular, relative rotation between the slide member 10 to the guide case 1 will not take place. An anchorage wall 16, which is formed with a slit 17, is fixedly mounted between the side walls 12 and 13 and spaced forwardly from the front end wall 11. The control wire W extends through the slit 17 of the anchorage wall 16 and a wire end block Wa disposed between the anchorage wall 16 and the front end wall 11 (see FIG. 2) functions to fixedly anchor the control wire W to the slide member 10. The female threaded portion 15 in block 14 is formed on the surface of a part-cylindrical groove of the rear end block 14 so as to cause the rear end block 14 to serve as an unrotatable so-called half nut. This construction of the rear end block 14 will make possible manufacturing of the rear end block 14 by a moulding process because a tapping process is not required to form the female thread as would be the case if block 14 were completely enclosed on all sides.

The numeral 20 denotes the rotatable shaft having formed thereon within an area adjacent one end thereof a male threaded portion 21 which cooperates with the female threaded portion 15 of the slide member 10. At the opposite end of the rotatable shaft 20 a knob K is fixedly mounted. A small diameter rod 22 (see FIGS. 2 and 3) is formed at the end of the rotatable shaft 20 adjacent the forward end of the threaded portion 21 and is rotatably supported by the bearings 8. Adjacent the rearward end of the threaded portion 21 a radial extension 23 (see FIG. 3) is formed on the shaft 20 and is disposed between a shoulder 19 formed adjacent the opening 5 and a washer 19a kept in the illustrated operative position by an indicator 30 in order to prevent axial movement of the rotatable shaft 18 with respect to the guide case 1. Manually rotating the knob K will therefore cause the longitudinal sliding movement of the slide member 10 within the guide case 1, thus pulling or pushing the control wire W fixed to the slide member 10.

A mechanism is provided which prevents further rotation of the shaft 20 in the same direction to let an operator notice that the slide member 10 has come to a limiting position, thereby to define the limiting position of the slide member 10.

This mechanism involves a stop piece 25 removably mounted to the rotatable shaft 20 for rotation therewith and abutment means 18 formed on inner surfaces of the side walls 12 and 13.

If it is desired to define the rearward limiting position of the movement of the slide member 10, the abutment means 18 takes the form of a pair of projections 18a and 18b formed on the inner surfaces of the side walls 12 and 13 adjacent the forward ends thereof. The pair of projections 18a and 18b are arranged such that a pair of radial projections of the stop piece 25 will abut the projections 18a and 18b when the slide member 10 has moved to the rearward limiting position (see FIGS. 9A and 9B).

If it is also desired to define the forward limiting position of the movement of the slide member 10, the abutment means involves, in addition to the aforementioned pair of projections 18a and 18b, a projection 18c on one of the inner surfaces of the side walls 12 and 13 (see FIG. 2). This projection 18c is arranged such that, when the slide member 10 has moved to the forward limiting position, it will abut one of the radial projection of the stop piece 25 to prevent further rotation of the rotatable shaft 20 in the same direction (see FIGS. 8A and 8B).

In this embodiment, the pair of projections 18a and 18b are formed on the inner surfaces of the side walls 12 and 13 adjacent the forward ends thereof and the single projection 18c is formed on the inner surface of the side wall 12 adjacent the rearward end thereof, as shown in FIG. 2.

Indicator 30 indicating the angle of the headlights H.L is secured to the rear flange 4 of the guide case 1 by means of a plurality of screws 31. The indicator 30 includes a housing 32, a worm gear 33 and a cooperating worm wheel 34 (see FIG. 3), a pointer 35 rotatably mounted within the housing 32 and rotatable by the worm wheel 34, a spring 36 (see FIG. 2) to prevent oscillation of the pointer 35 due to the backlash between the worm gear 33 and worm wheel 34, an indicator plate 35, a lamp 38 to apply a light to the back surface of the indicator plate 37 (see FIG. 2) to illuminate the same, and a lens 39 mounted within a window for the indication. Due to the worm gear 33 fixedly coupled with the rotatable shaft 18 and the worm wheel 34 meshing with the worm gear 33, fore and aft sliding movement of the slide member 10 will cause the pointer 35 to rotate about its axis so that the pointer 35 will indicate an appropriate location on the indicator plate 37 on which the letter UP (the abbreviation of up) and the letter DN (the abbreviation of down) are printed (see FIGS. 3 and 6). Therefore, the pointer 35 indicates the angle of the headlight beams.

The operation of the device is as follows. When the knob K is rotated to simultaneously rotate the shaft 20 the slide member 10 threadedly engaged with the shaft 20 is urged either away from or toward the knob K, i.e., the slide member 10 being urged forwardly or rearwardly within the guide case 1. When the slide member 10 is urged rearwardly within the guide case 1 the cable W (see FIG. 1) is retracted in a similar direction to rotate the lever L clockwise, viewing in FIG. 1, thereby to retract the cables W' toward each other to adjust the headlight beams downwardly. When the slide member 10 is urged forwardly within the guide case 1 the cable W is allowed to extend in a similar direction to rotate the level L anti-clockwise, thereby to permit the cables W' to extend away from each other to adjust the headlight beams upwardly.

Figures 8A, 8B:
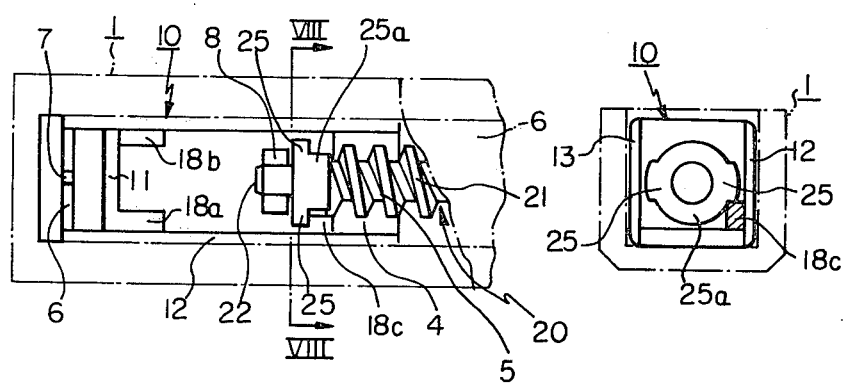
FIG. 8A is a partial view of FIG. 2 with unnecessary component parts removed to show the condition that the slide member has come to one of limiting positions thereof.
FIG. 8B is a sectional view taken though the line VIII—VIII of FIG. 8A.

When for the purpose of adjusting the headlight beam angle upwardly to a maximum the slide member 10 has been moved to the forward limiting position as shown in FIGS. 8A and 8B by rotation of the knob K, the stop piece 25 on the leading end of the shaft 20 will abut the projection 18c so that further rotation of the knob K in the same direction will be prevented. Since the abutting of the stop piece 25 on the projection 18c will prevent the rotation of the knob K, the forward limiting position of the slide member 10 will be felt clearly by an operator manipulating the knob K.

Figures 9A, 9B:
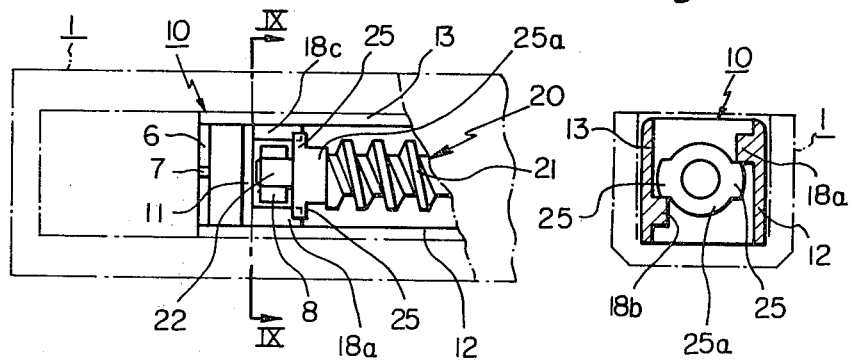
FIG. 9A is a similar view to FIG. 8A showing the condition that the slide member has come to the other limiting position.
FIG. 9B is a section taken through the line IX—IX of FIG. 9A.

When for the purpose of adjusting the headlight beam angle downwardly to a maximum the slide member 10 has been moved to the rearward limiting position as shown in FIGS. 9A and 9B by rotation of the knob K, the stop piece 25 on the leading end of the shaft 20 will abut the pair of projections 18a and 18b so that further rotation of the knob K in the same direction will be prevented.

Since the slide member 10 has its female threaded portion 15 in half nut form and the pair of projections 18a and 18b and the projection 18c are shaped and arranged such that the slide member 10 including these projections may be moulded, the slide member 10 including the female threaded portion 15 and these projections 18a, 18b and 18c can be formed by a moulding at one time.

Figure 10:
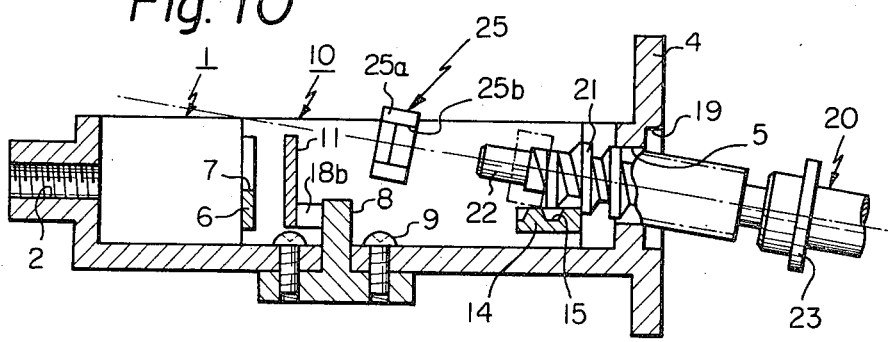
FIG. 10 is a longitudinal sectional exploded view of the remote controller, showing how to install the rotatable shaft and a stop piece in the guide case.

Another advantage derived from the half nut form female threaded portion 15 of the slide member 10 is that, in assembly, the stop piece 25 can be easily assembled with the shaft 20 because, as shown in FIG. 10, after the slide member 10 has been placed in the guide case 1, when the rotating shaft 20 is inclined upwardly to the illustrated position after inserting through the aperture 5, the stop piece 25 can be easily coupled with the leading end portion of the shaft 18 and subsequently the male threaded portion 21 can be engaged with the female threaded portion 15 to mesh with the same.

I claim:

1. A remote controller in a headlight beam adjusting device for a motor vehicle having a body and a headlight, the headlight beam adjusting device having pivotal mounting means for pivotally mounting the headlight on the vehicle body, means for biasing the headlight in one direction of tilt and cable means connected at one terminal thereof to the mounting means for pulling the headlight in the opposite direction, the remote controller comprising:
    a guide case of box-like shape fixed to the vehicle body at a location remote from the headlight;
    a box-like slide member mounted within said guide case for axial movement but against rotation with respect to said guide case, said slide member having one open axial side and an opposed cylindrically shaped axial inner wall provided with a threaded portion and an end connected to the other terminal of said cable means; and
    a shaft rotably mounted within said guide case for rotation but against axial movement with respect to said guide case, said rotatable shaft having a threaded portion engaging said threaded portion of said slide member with respect to said guide case and thereby adjusting the tilt of the headlight.

2. A remote controller as claimed in claim 1, in which the threaded portion of said slide member is constructed to engage only the foward part of the threaded portion of said rotatable shaft.

* * * * *

UNITED STATES PATENT AND TRADEMARK OFFICE
CERTIFICATE OF CORRECTION

PATENT NO. : 4,336,572
DATED : June 22, 1982
INVENTOR(S) : Yasunobu Takata

It is certified that error appears in the above-identified patent and that said Letters Patent is hereby corrected as shown below:

On the title page, Item (30) Foreign Application Priority Data:

The correct number of the corresponding Japanese Application is -- 52-129671 (U) --.

Signed and Sealed this

Nineteenth Day of July 1983

[SEAL]

Attest:

GERALD J. MOSSINGHOFF

Attesting Officer — Commissioner of Patents and Trademarks

UNITED STATES PATENT AND TRADEMARK OFFICE
CERTIFICATE OF CORRECTION

PATENT NO. : 4,336,572
DATED : June 22, 1982
INVENTOR(S) : YASUNOBU TAKATA

It is certified that error appears in the above-identified patent and that said Letters Patent is hereby corrected as shown below:

Cover page,

[73] Assignees: The correct address of Nissan Motor Company, Limited is:--Yokohama City, Japan--.

and that of: Ichiko Industries Limited is: -- Tokyo, Japan --.

Signed and Sealed this

Twenty-ninth Day of November 1983

[SEAL]

Attest:

GERALD J. MOSSINGHOFF

Attesting Officer     Commissioner of Patents and Trademarks